(12) United States Patent
Ohmi et al.

(10) Patent No.: US 10,077,058 B2
(45) Date of Patent: Sep. 18, 2018

(54) VEHICLE CONTROL DEVICE

(71) Applicant: Toyota Jidosha Kabushiki Kaisha, Toyota-shi, Aichi-ken (JP)

(72) Inventors: Masanobu Ohmi, Kasugai (JP); Seiji Yamamoto, Seto (JP); Kosuke Sakakibara, Toyota (JP); Kazuki Sugie, Miyoshi (JP); Misato Kinoshita, Toyota (JP); Yoshiaki Matsumura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/424,143

(22) Filed: Feb. 3, 2017

(65) Prior Publication Data

US 2017/0282933 A1 Oct. 5, 2017

(30) Foreign Application Priority Data

Mar. 30, 2016 (JP) .................... 2016-068663

(51) Int. Cl.
*B60R 21/207* (2006.01)
*B60W 50/00* (2006.01)
(Continued)

(52) U.S. Cl.
CPC ....... *B60W 50/0098* (2013.01); *B60R 21/207* (2013.01); *B60R 21/23138* (2013.01); *B60W 10/04* (2013.01); *B60W 10/20* (2013.01); *B60W 30/08* (2013.01); *B60W 30/18009* (2013.01); *B60W 50/14* (2013.01);
(Continued)

(58) Field of Classification Search
CPC ..... B60R 21/20; B60R 21/207; B60R 21/233; G01C 21/26; B60N 2/42

USPC .............. 701/409, 408; 297/216.12, 216.13; 280/730.1
See application file for complete search history.

(56) References Cited

U.S. PATENT DOCUMENTS

| | | | | |
|---|---|---|---|---|
| 7,445,284 B2 * | 11/2008 | Gerfast | ................ | B60N 2/4221 297/216.12 |
| 9,573,553 B2 * | 2/2017 | Ko | ......................... | B60R 21/233 |
| 2010/0004815 A1 | 1/2010 | Ewerhart et al. | | |
| 2012/0209505 A1 * | 8/2012 | Breed | ................. | G01C 21/3697 701/409 |
| 2013/0015642 A1 * | 1/2013 | Islam | ..................... | B60R 21/207 280/730.1 |
| 2014/0327234 A1 * | 11/2014 | Heurlin | ................. | B60R 21/207 280/730.1 |
| 2016/0121839 A1 * | 5/2016 | Ko | ......................... | B60R 21/233 280/730.1 |
| 2017/0028955 A1 * | 2/2017 | Ohno | ..................... | B60R 21/207 |
| 2017/0267124 A1 * | 9/2017 | Numazawa | ........... | B60N 2/0244 |

(Continued)

FOREIGN PATENT DOCUMENTS

| | | |
|---|---|---|
| JP | 2000-344044 A | 12/2000 |
| JP | 2008537920 A | 10/2008 |

(Continued)

*Primary Examiner* — Thomas G Black
*Assistant Examiner* — Wae L Louie
(74) *Attorney, Agent, or Firm* — Dinsmore & Shohl LLP (57) ABSTRACT

A vehicle control device that includes: an airbag device including an airbag, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant; and a controller that, after the airbag device has been actuated, executes a drive-to-refuge mode in which driving of a power unit of a vehicle and steering of a steering system are controlled to drive the vehicle to take refuge at a road shoulder.

15 Claims, 8 Drawing Sheets

(51) Int. Cl.
  *B60W 10/04* (2006.01)
  *B60W 10/20* (2006.01)
  *B60W 30/18* (2012.01)
  *B60W 30/08* (2012.01)
  *B60W 50/14* (2012.01)
  *G05D 1/00* (2006.01)
  *G05D 1/02* (2006.01)
  *B60R 21/231* (2011.01)

(52) U.S. Cl.
  CPC ......... *G05D 1/0055* (2013.01); *G05D 1/0246* (2013.01); *B60R 2021/2074* (2013.01); *B60R 2021/23146* (2013.01); *B60W 2030/082* (2013.01); *B60W 2050/143* (2013.01); *B60W 2420/42* (2013.01); *B60W 2550/143* (2013.01); *B60W 2600/00* (2013.01); *G05D 2201/0213* (2013.01)

(56) References Cited

U.S. PATENT DOCUMENTS

2017/0282933 A1* 10/2017 Ohmi ................ B60R 21/23138
2017/0291560 A1* 10/2017 Schroeder ............. B60T 8/1755
2017/0361800 A1* 12/2017 Ohachi ................ B60R 21/231

FOREIGN PATENT DOCUMENTS

| | | |
|---|---|---|
| JP | 2009-151522 A | 7/2009 |
| JP | 2014024367 A | 2/2014 |
| WO | 2016/174785 A1 | 11/2016 |

\* cited by examiner

VEHICLE CONTROL DEVICE

CROSS-REFERENCE TO RELATED APPLICATION

This application is based on and claims priority under 35 USC 119 from Japanese Patent Application No. 2016-068663 filed on Mar. 30, 2016, which is incorporated by reference herein.

BACKGROUND

Technical Field

The present disclosure relates to a vehicle control device.

Related Art

In an airbag device described in Japanese Patent Application Laid-Open (JP-A) No. 2000-344044, an airbag is inflated so as to surround the front and sides of the head of an occupant during a collision. Specifically, a gas supply pipe is fixed to a seatback, and the airbag is attached to the gas supply pipe. Gas from an inflator is supplied into the airbag through the gas supply pipe to inflate the airbag.

SUMMARY

A vehicle control device of an aspect includes: an airbag device including an airbag that is inflated and deployed from a state stowed in a headrest or a seatback of a vehicle seat on receiving gas supplied by an inflator, the airbag being configured as an integral bag body for surrounding the head of an occupant with a front deployment section including a front inflation section that is inflated and deployed in front of a seat corresponding to the head and at least one of the shoulders or the chest of the occupant, and a left and right pair of lateral deployment sections including lateral inflation sections that are connected to the front deployment section and are inflated and deployed at the sides of the head of the occupant; and a controller that, after the airbag device has been actuated, executes a drive-to-refuge mode in which driving of a power unit of a vehicle and steering of a steering system are controlled to drive the vehicle to take refuge at a road shoulder.

DESCRIPTION OF EMBODIMENTS

Figure 1:
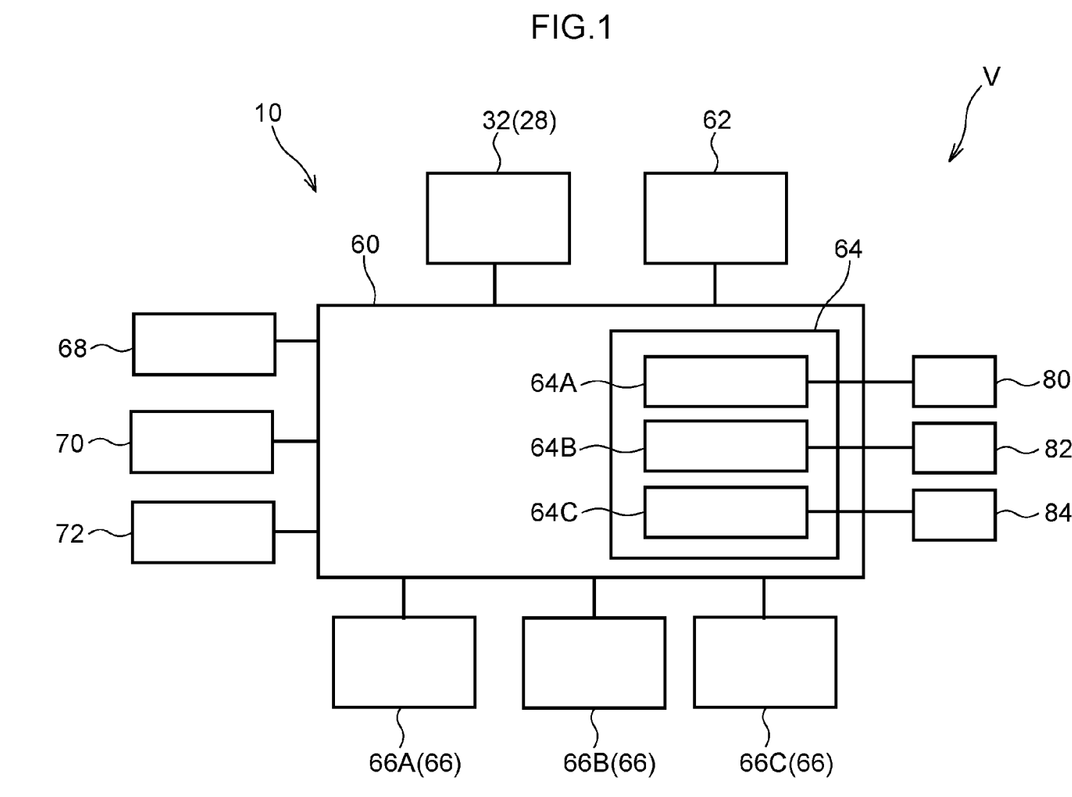
FIG. 1 is a block diagram illustrating a vehicle control device according to an exemplary embodiment.

Explanation follows regarding a vehicle control device 10 according an exemplary embodiment, with reference to the drawings. As illustrated in FIG. 1, the vehicle control device 10 is configured including a multidirectional airbag device 28 serving as an "airbag device" installed in a vehicle seat 12 (see FIG. 2) of a vehicle (automobile) V, and an ECU 60 serving as a "controller". Explanation first follows regarding the vehicle seat 12 installed with the multidirectional airbag device 28, and then regarding the multidirectional airbag device 28 and the ECU 60. Note that the arrow FR and the arrow UP respectively indicate the front direction (the direction which a seated occupant faces) and an upper direction of the vehicle seat 12 in each of the drawings as appropriate. Unless specifically stated otherwise, simple reference to the front-rear, up-down, and left-right directions refers to front and rear in the seat front-rear direction, up and down in the seat vertical direction, and left and right in a case in which facing the front in the seat front-rear direction. Note that the arrow IN in each of the drawings as appropriate indicates the vehicle center in the vehicle width direction of the vehicle V.

Figure 2:
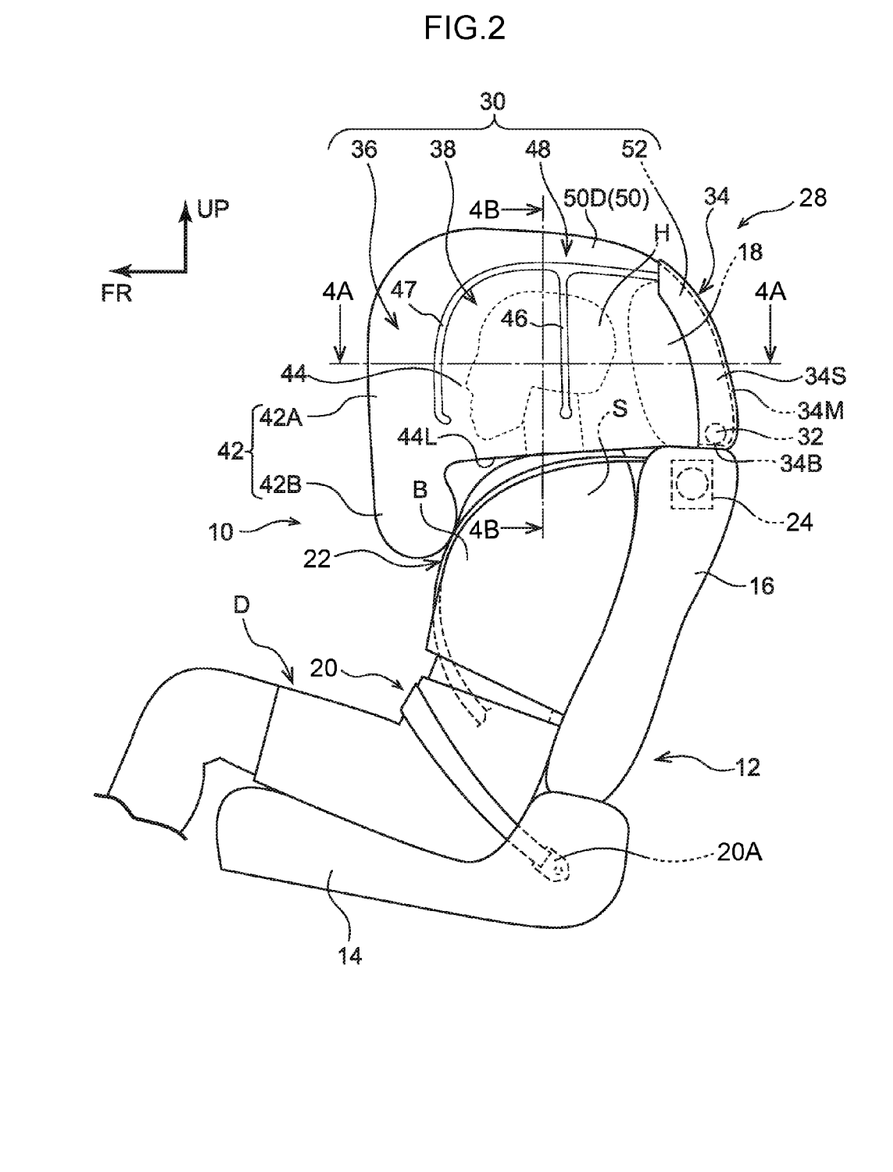
FIG. 2 is a side-on view schematically illustrating a protection mode of a seated occupant by the multidirectional airbag device illustrated in FIG. 1.
Figure 3:
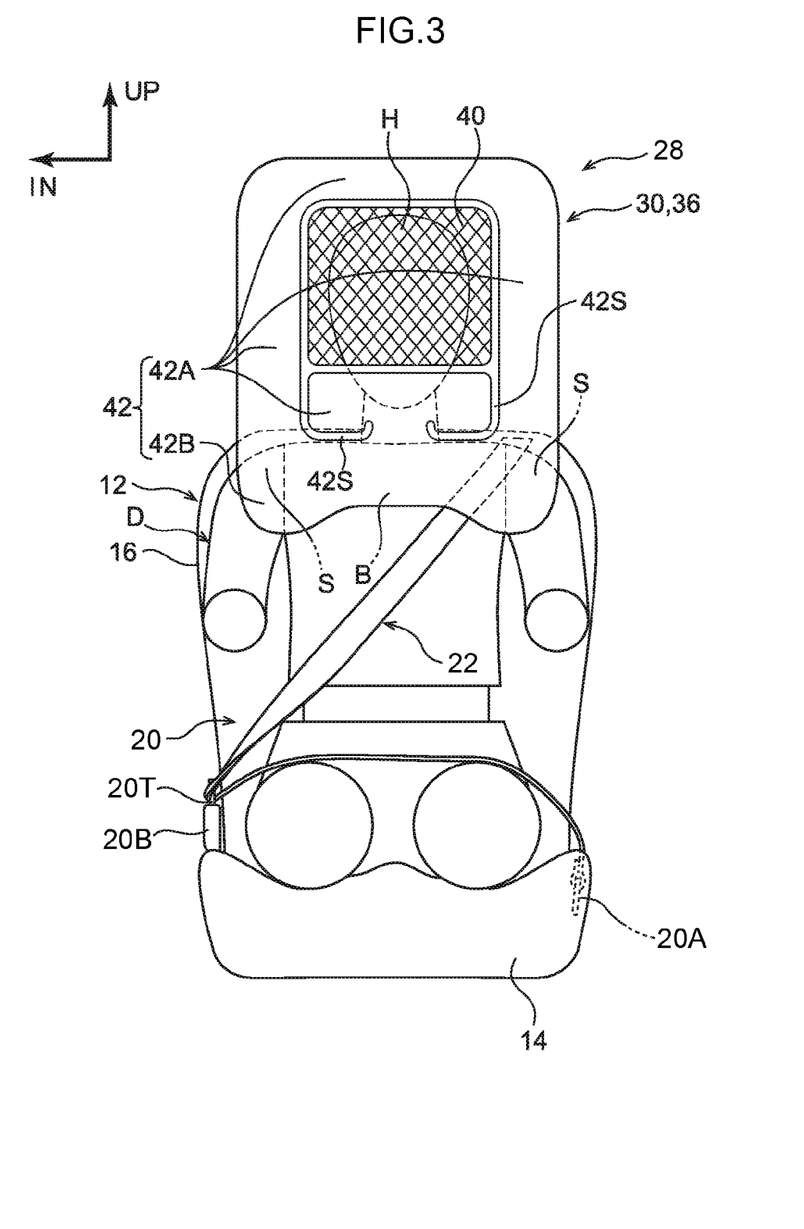
FIG. 3 is a face-on view schematically illustrating a protection mode of a seated occupant by the multidirectional airbag device illustrated in FIG. 2.

As illustrated in FIG. 2 and FIG. 3, the vehicle seat 12 is disposed offset toward either the left or right (the left in the present exemplary embodiment) of the vehicle width direction center of a vehicle body of the vehicle V. In the present exemplary embodiment, the seat front-rear direction of the vehicle seat 12 matches the front-rear direction of the vehicle V, and the seat width direction matches the vehicle width direction. The vehicle seat 12 is configured including a seat cushion 14, a seatback 16 with a lower end coupled to a rear end of the seat cushion 14, and a headrest 18 provided to an upper end of the seatback 16.

Figure 6:
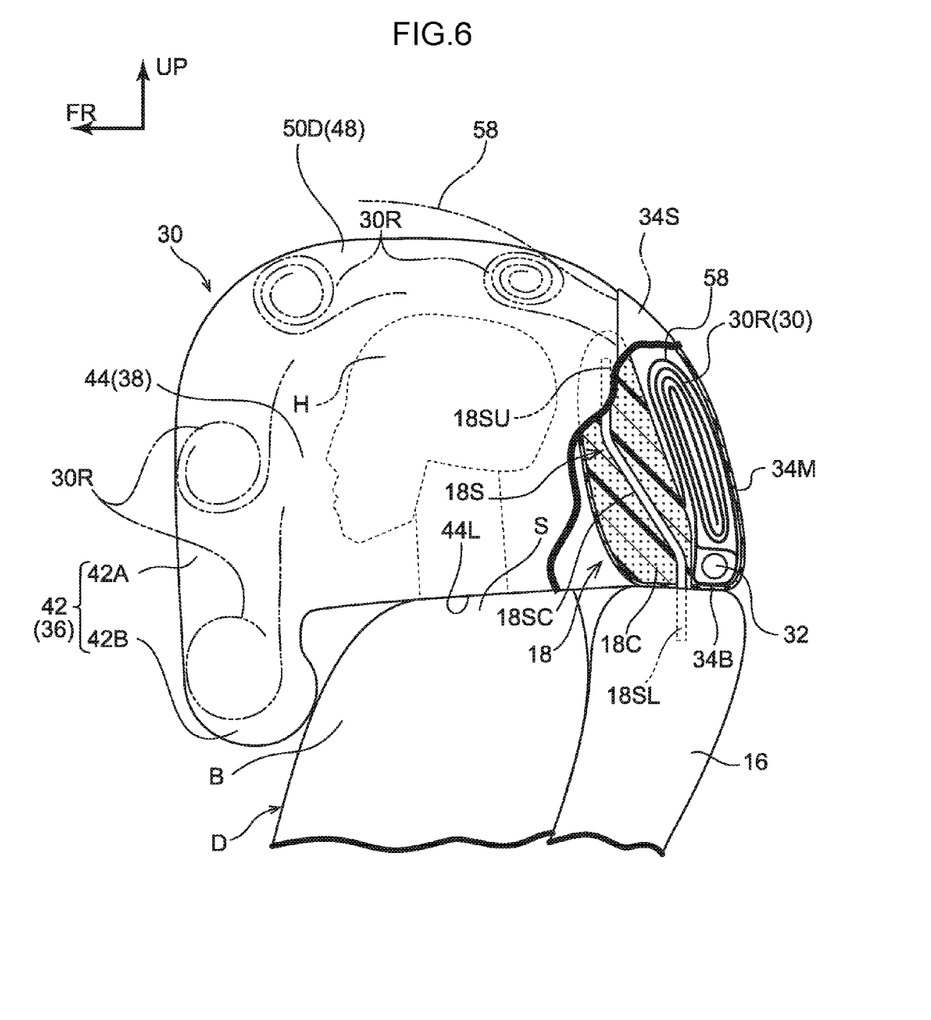
FIG. 6 is a partially cutout, schematic enlarged side-on view for explaining an inflation and deployment process of a multidirectional airbag configuring the multidirectional airbag device illustrated in FIG. 2.

As illustrated in FIG. 6, the headrest 18 is attached to the seatback 16 through a headrest stay 18S. An upper portion 18SU of the headrest stay 18S is positioned further forward than a lower portion 18SL thereof that is supported by the seatback 16, and the lower portion 18SL and the upper portion 18SU are coupled together by an inclined intermediate portion 18SC.

FIG. 2, FIG. 3, FIG. 5A and FIG. 5B, etc. illustrate a crash test dummy (doll) D, serving as a model of an occupant to be protected, in a seated state on the seat cushion 14 of the vehicle seat 12. The dummy D is, for example, a World Side Impact Dummy (World SID) of a 50th percentile American adult male (AM50). The dummy D is seated in a standard seated posture specified in crash testing methods, and the vehicle seat 12 is positioned in a reference setting position corresponding to the seated posture. In the interest of simplicity of explanation, the dummy D is hereafter referred to as "seated occupant D".

As illustrated in FIG. 2 and FIG. 3, the vehicle seat 12 includes a seatbelt device 20 configured as a three point seatbelt device. Specifically, one end of a belt (webbing) 22 of the seatbelt device 20 is coupled to a spool of a retractor 24, and the belt 22 is taken up onto the spool so as to be capable of being pulled out therefrom. Another end of the belt 22 is fixed to an anchor 20A. A tongue plate 20T is provided to the belt 22 so as to be capable of sliding, and the belt 22 is worn by the seated occupant D by anchoring the tongue plate 20T to a buckle 20B.

Configuration of Multidirectional Airbag Device

As illustrated in FIG. 2, the multidirectional airbag device 28 is configured including a multidirectional airbag 30 serving as an "airbag", an inflator 32, and a module case (also referred to as an airbag case) 34. The multidirectional airbag 30 is stowed inside the module case 34 in a folded state, and the multidirectional airbag device 28 is modularized. The modularized multidirectional airbag device 28 is provided in the headrest 18 (see FIG. 5A and FIG. 6). Detailed explanation follows below.

Multidirectional Airbag

Figure 4A:
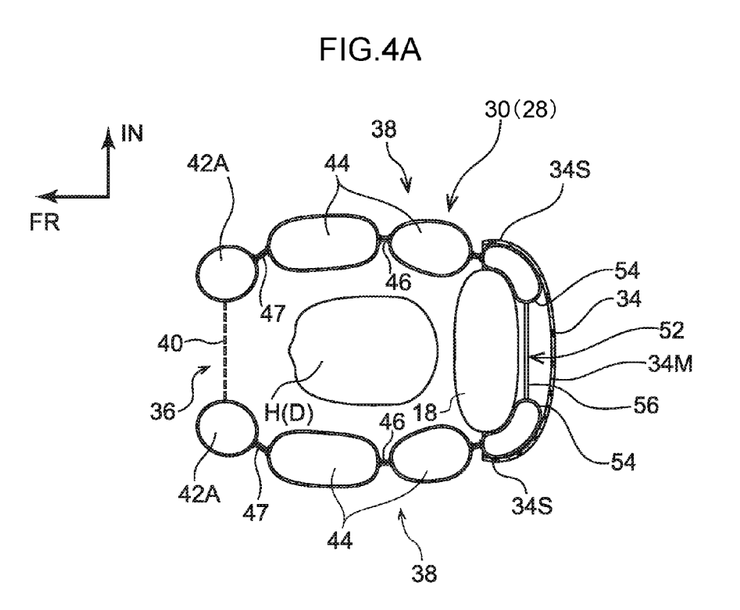
FIG. 4A is a cross-section taken along line 4A-4A in FIG. 2, illustrating an inflated and deployed state of a multidirectional airbag configuring the multidirectional airbag device illustrated in FIG. 2.

As illustrated in FIG. 4A, the multidirectional airbag 30 is configured as an integral bag body that is inflated and deployed so as to surround the head H of the seated occupant D (hereafter sometimes simply referred to as "head H") from the front and both left and right sides in a plan cross-section view. Specifically, as illustrated in FIG. 2 to FIG. 4B, the multidirectional airbag 30 is configured including a front deployment section 36 that is deployed in front of the head H, and a left and right pair of lateral deployment sections 38 that are deployed on both left and right sides of the head H.

The front deployment section 36 is configured including a mesh section 40 deployed in front of the head H, and a front inflation section 42 that is inflated and deployed so as to surround the mesh section 40 in face-on view. The mesh section 40 is formed in a substantially rectangular shape in face-on view, and forms a vision-enabling (see-through) structure. The front inflation section 42 is formed in a rectangular frame shape, and an inner peripheral edge of the front inflation section 42 is joined to the mesh section 40. The front inflation section 42 is inflated and deployed on being supplied with gas.

As illustrated in FIG. 3, a portion of the front inflation section 42 that surrounds the mesh section 40 and is mainly above the seatback 16 configures a first inflation portion 42A. The first inflation portion 42A is inflated and deployed in front of the head H. A portion of the front inflation section 42 positioned below the first inflation portion 42A (overlapping the seatback 16) configures a second inflation portion 42B. The second inflation portion 42B is inflated and deployed in front of the chest B and shoulders S, as well as the head H, of the seated occupant D. The upper body of the seated occupant D is thereby restrained by the second inflation portion 42B. Gas is supplied to the second inflation portion 42B through the first inflation portion 42A. Note that in the present exemplary embodiment, a portion of the first inflation portion 42A positioned below the mesh section 40 is partitioned from other portions of the first inflation portion 42A by seams 42S, and is supplied with gas through the second inflation portion 42B.

Figure 4B:
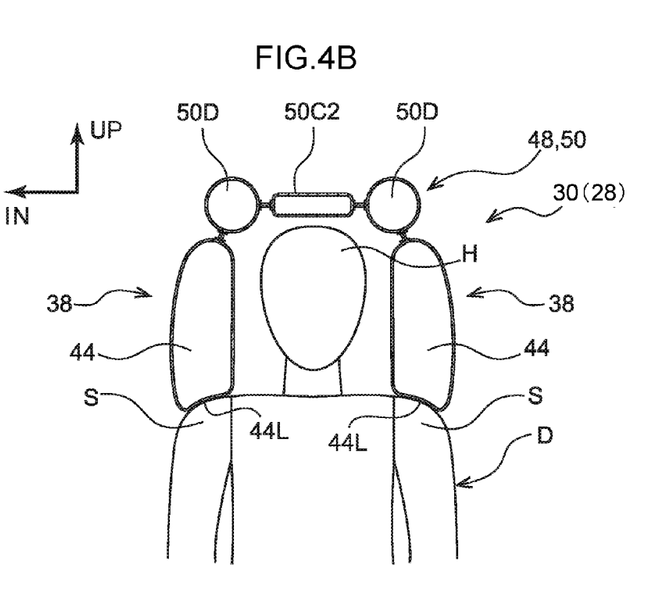
FIG. 4B is a cross-section taken along line 4B-4B in FIG. 2, illustrating an inflated and deployed state of a multidirectional airbag configuring the multidirectional airbag device illustrated in FIG. 2.

As illustrated in FIG. 2, FIG. 4A, and FIG. 4B, the lateral deployment sections 38 respectively include lateral inflation sections 44 that are inflated and deployed on both left and right sides of the head H on being supplied with gas. The size of each lateral inflation section 44 is set to a size (surface area) overlapping the entire head H in a side-on view. A seam portion 46 is formed extending along the vertical direction at a front-rear direction intermediate portion of each lateral inflation section 44. The lateral inflation section 44 is partitioned into front and rear by the seam portion 46. More specifically, the seam portion 46 partitions the lateral inflation section 44 into front and rear at a portion of the lateral inflation section 44 overlapping the head H.

Front ends of the left and right lateral inflation sections 44 are linked in a communicating state to corresponding left and right lower ends (in the vicinity of boundaries with the second inflation portion 42B) of the first inflation portion 42A of the front inflation section 42. The left and right lateral inflation sections 44 are thereby supplied with gas via the front inflation section 42. A seam portion 47 is provided between the first inflation portion 42A of the front inflation section 42 and each lateral inflation section 44, and the first inflation portion 42A and the lateral inflation section 44 are partitioned from each other above the above-described communicating portion by the seam portion 47.

Respective lower ends 44L of the lateral inflation sections 44 in the left and right lateral deployment sections 38 contact the tops of the shoulders S of the seated occupant D in an inflated and deployed state of the multidirectional airbag 30. A vertical direction position of the multidirectional airbag 30 in the inflated and deployed state with respect to (the head H of) the seated occupant D is determined in this manner. Note that in the positioned state of the multidirectional airbag 30, configuration is such that neither the front deployment section 36, the left and right lateral deployment sections 38, nor an upper deployment section 48, described later, touch the head H of the seated occupant D in a normal seated posture (a gap is formed therebetween).

As illustrated in FIG. 2, the multidirectional airbag 30 also includes the upper deployment section 48 deployed above the head H of the seated occupant D. The upper deployment section 48 is linked to respective upper edges of the front deployment section 36 and the left and right lateral deployment sections 38. The upper deployment section 48 is configured by an upper inflation section 50, which is inflated and deployed on being supplied with gas, as a relevant portion. The upper inflation section 50 is configured including a central inflation portion 50C (see FIG. 7) inflated and deployed above the head H, and a pair of upper duct portions 50D respectively extending along the front-rear direction on the left and right of the central inflation portion 50C.

Figure 7:
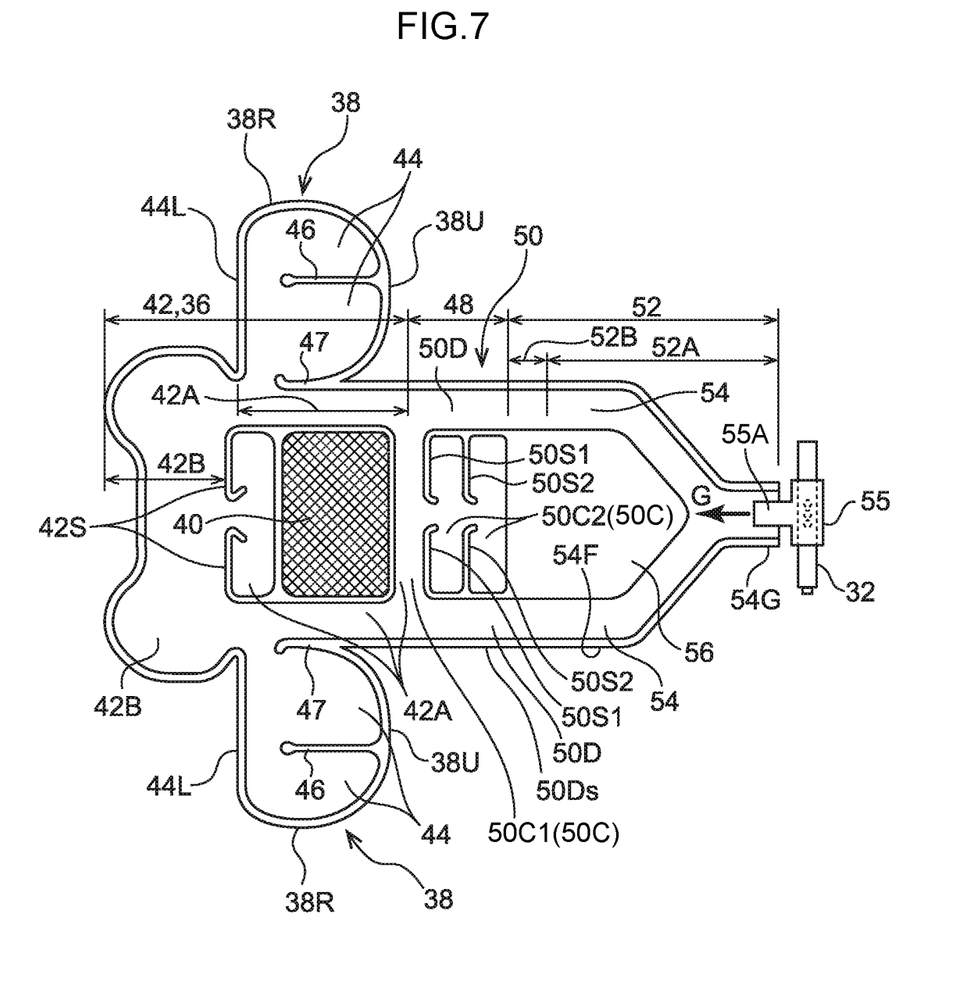
FIG. 7 is a drawing illustrating a flat pattern of a multidirectional airbag configuring the multidirectional airbag device illustrated in FIG. 2.

As illustrated in FIG. 7, the central inflation portion 50C includes an inflation portion 50C1 that is common to a portion forming an upper edge of the front inflation section 42, and an inflation portion 50C2 that is partitioned from the inflation portion 50C1 by seam portions 50S1 so as to enable gas to flow through. Both left and right ends of the inflation portion 50C1 are in communication with the upper duct portions 50D, and a seat width direction center portion at a rear edge of the inflation portion 50C1 is in communication with the inflation portion 50C2. The inflation portion 50C2 is partitioned into front and rear by seam portions 50S2 so as to enable gas to flow through. Respective front ends of the left and right upper duct portions 50D are in communication with both left and right side edges at an upper end of the front inflation section 42.

The multidirectional airbag 30 also includes a rear deployment section 52 that is deployed behind the upper deployment section 48. The rear deployment section 52 is configured including rear duct sections 54, these being inflation sections, and a non-inflating section 56. The rear duct sections 54 are separated into left and right, and respective upper ends thereof are linked in a communicating state to the corresponding left and right upper duct portions 50D. The left and right rear duct sections 54 are coupled together at the non-inflating section 56, a front edge of which is joined to a rear edge of the central inflation portion 50C.

In an opened-out shape (flat pattern) illustrated in FIG. 7, the left and right rear duct sections 54 merge with each other below the pentagonal shaped non-inflating section 56 to form a gas introduction portion 54G. The gas introduction portion 54G is connected to the inflator 32 through a T-shaped diffuser 55, so as to be capable of being supplied with gas therefrom (see the arrow G). Namely, a gas ejection end 55A of the diffuser 55 is inserted into the gas introduction portion 54G in an airtight state. Note that there is no limitation to a configuration employing the diffuser 55. For example, part of a vertically disposed inflator 32 that includes a gas ejection port may be inserted into the gas introduction portion 54G or for example, the gas introduction portion 54G may be configured bent into an L shape and the part of a horizontally disposed inflator 32 that includes a gas ejection port may be inserted into the gas introduction portion 54G.

The rear deployment section 52 explained above may be divided into a base portion 52A deployed behind the headrest 18, and a coupling portion 52B deployed above the headrest 18. A lower end of the base portion 52A is supported by the seatback 16 through the inflator 32, and the coupling portion 52B links the base portion 52A and the upper deployment section 48 together in a communicating state.

Prior to being folded, the multidirectional airbag 30 has an opened-out shape such as that illustrated in FIG. 7. The multidirectional airbag 30 in the opened-out shape is formed into an integral bag body by being one piece woven (OPW). Note that the multidirectional airbag 30 may be formed as an integral bag body by a method involving stitching peripheral edges of two pieces of woven material together (cut & sew).

From the state of the multidirectional airbag 30 illustrated in FIG. 7, upper edges 38U of the lateral deployment sections 38 are joined by stitching or the like to respective side edges 50Ds of the upper duct portions 50D, and rear edges 38R of the lateral deployment sections 38 are joined by stitching or the like to respective front edges 54F of the rear duct sections 54. The multidirectional airbag 30 is folded in this joined state and stowed in the module case 34. A folding mode of the multidirectional airbag 30 is described later together with configuration the module case 34, as well as configuration of a deployment guide cloth 58.

Inflator

As illustrated in FIG. 6, a combustion type or cold gas type inflator is employed as the inflator 32. The inflator 32 generates gas on being actuated, and the gas is supplied into the multidirectional airbag 30. In the present exemplary embodiment, the inflator 32 is a cylinder type inflator, and is disposed with its length direction along the seat width direction inside the module case 34. Actuation of the inflator 32 is controlled by the ECU 60, described later.

Module Case

As illustrated in FIG. 2 and FIG. 6, the module case 34 is disposed at a rear portion of the headrest 18, covers the rear portion of the headrest 18 from above and both left and right sides, and configures a rear styling portion of the headrest 18. In a face-on view, the module case 34 projects further upward than an upper end of the headrest 18, and juts out from both seat width direction sides of the headrest 18.

The module case 34 is configured including a base portion 34B, a main wall 34M, and a left and right pair of side walls 34S as relevant portions. The base portion 34B configures a portion fixed to the upper end of the seatback 16.

The main wall 34M extends upward from a rear end of the base portion 34B and configures a rear wall of the module case 34. Specifically, the main wall 34M is tilted forward such that an upper end is positioned further forward than a lower end that is fixed on the seatback 16, and forms a curved shape so as to bulge upward and rearward in a side-on view. In a face-on view, the main wall 34M projects further upward than the upper end of the headrest 18, and juts out from both seat width direction sides of the headrest 18.

A space is formed between the main wall 34M and the headrest 18, and the multidirectional airbag 30 is stowed inside this space in a folded state. The multidirectional airbag 30 is configured so as to pass between the upper end portion of the main wall 34M and the headrest 18 in an inflation and deployment process. In the inflated and deployed state of the multidirectional airbag 30, the coupling portion 52B of the rear deployment section 52 (see FIG. 7) passes between the upper end portion of the main wall 34M and the headrest 18.

The pair of side walls 34S extend forward from both seat width direction ends of the main wall 34M, and cover the rear portion of the headrest 18 in a side-on view. The lateral deployment sections 38 (portions in the vicinity of boundaries with the rear deployment section 52) the multidirectional airbag 30 in the inflated and deployed state pass between the pair of side walls 34S and the headrest 18.

The multidirectional airbag 30 is rolled up outward and stowed inside the module case 34. Rolling up outward refers to a mode of folding into a rolled-up shape from a front end side toward the upper side and rear side, so as to fold in the opposite direction to that during the deployment process illustrated in FIG. 6. Namely, as illustrated by the imaginary lines in FIG. 6, rolling up outward is a mode of folding in which a rolled-up portion 30R is positioned at the outside (the opposite side to the head H side) in the deployment process of the multidirectional airbag 30. As described above, in the multidirectional airbag 30, in which the lateral deployment sections 38 are stitched to the upper deployment section 48 and the rear deployment section 52, the lateral deployment sections 38 are rolled up inward at the stage at which to the front deployment section 36 and the upper deployment section 48 are rolled up outward.

In the folded state, at least part of the multidirectional airbag 30 is disposed behind the upper portion 18SU and the intermediate portion 18SC of the headrest stay 18S of the headrest 18. In the headrest 18 of the present exemplary embodiment, a cushioning material (pad) 18C is thinly formed behind the upper portion 18SU and the intermediate portion 18SC of the headrest stay 18S, and a folded-state stowing space is formed between the cushioning material 18C and the module case 34. On being supplied with gas, the multidirectional airbag 30 is inflated and deployed from between the cushioning material 18C and the module case 34 toward the module case 34 exterior. The main wall 34M of the module case 34 is configured so as to support the multidirectional airbag 30 in the inflation and deployment process from the rear (to bear reaction force in order to proceed forward) in a case in which this occurs. Due to having a curved shape in a side-on view as described above, the main wall 34M of the module case 34 is also configured so as to guide the multidirectional airbag 30 forward (forward and upward) in the inflation and deployment process in a case in which this occurs. Thus, the main wall 34M of the present exemplary embodiment functions as a support wall and a guide wall.

The deployment guide cloth 58 is folded and stowed together with the multidirectional airbag 30 inside the module case 34. A base portion of the deployment guide cloth 58 disposed at the outside (at the main wall 34M side) of the multidirectional airbag 30 that has been rolled up outward is connected to the inflator 32, or to a portion at the gas introduction portion 54G side (see FIG. 7), this being a base end side of the multidirectional airbag 30. A leading end side of the deployment guide cloth 58 is disposed at the inside (the headrest 18 side) of the outward rolled-up portion 30R so as to cover the rolled-up portion 30R of the multidirectional airbag 30 from the opposite direction (the counter-clockwise direction) to the rolled-up direction (the clockwise direction in FIG. 6) thereof.

As illustrated by the imaginary lines in FIG. 6, the deployment guide cloth 58 is led out of the module case 34 accompanying inflation and deployment (unrolling) of the multidirectional airbag 30, and is deployed in advance of the multidirectional airbag 30 between the multidirectional airbag 30 and a vehicle cabin ceiling. The deployment guide cloth 58 is set with a smaller coefficient of friction with respect to the multidirectional airbag 30 than to a ceiling material of the vehicle V. In the present exemplary embodiment, a face on the vehicle cabin ceiling side of the deployment guide cloth 58 is silicone coated, and a face of the deployment guide cloth 58 that contacts the multidirectional airbag 30 is a low friction face that is not silicone coated.

Figure 5A:
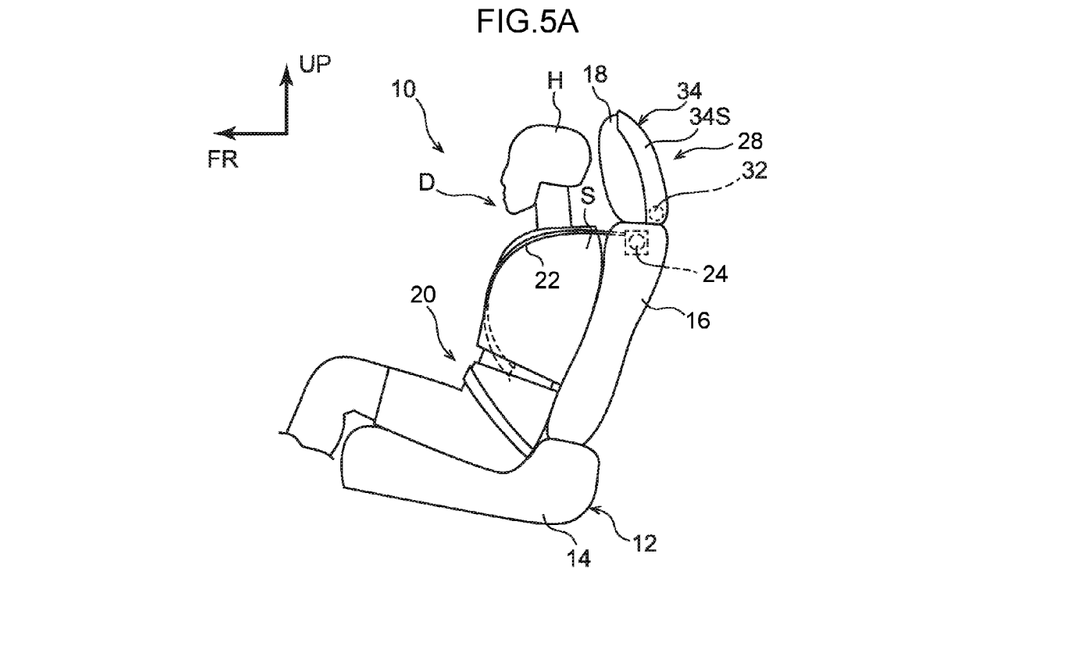
FIG. 5A is a side-on view of an overall outline configuration of the multidirectional airbag device illustrated in FIG. 2 prior to being actuated.
Figure 5B:
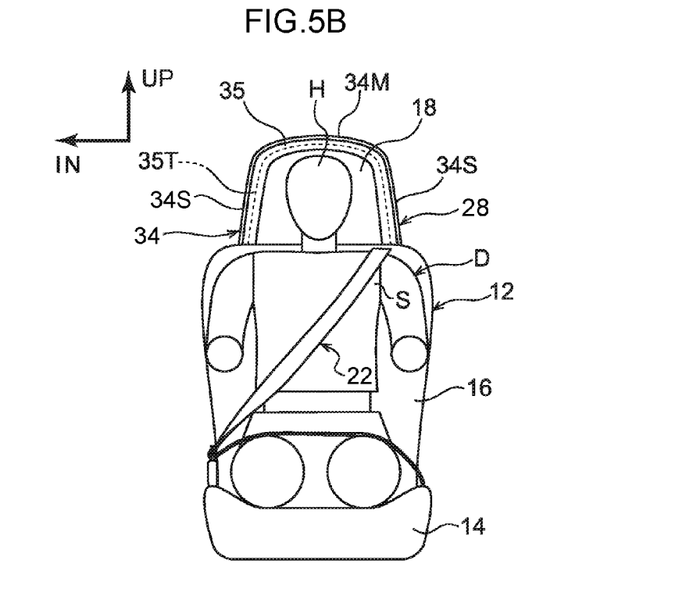
FIG. 5B is a face-on view of an overall outline configuration of the multidirectional airbag device illustrated in FIG. 2 prior to being actuated.

As illustrated in FIG. 5B, an airbag door 35 closes off between the module case 34 and the headrest 18 in a face-on view. Configuration is such that a tear line 35T formed in the airbag door 35 is split open by the deployment pressure of the multidirectional airbag 30 so as to permit the multidirectional airbag 30 to inflate and deploy toward the front.

Configuration of ECU

The ECU 60 controls the actuation of (the inflator 32 of) the multidirectional airbag device 28 previously described. After first actuating the multidirectional airbag device 28, the ECU 60 switches the vehicle V to automated driving, and drives the vehicle V to take refuge at the road shoulder (this driving mode is hereafter referred to as "drive-to-refuge mode"). Detailed explanation follows below.

As illustrated in FIG. 1, the inflator 32 of the multidirectional airbag device 28, and a collision sensor 62 (or a group of sensors), are electrically connected to the ECU 60. The ECU 60 is configured so as to be capable of detecting or predicting various modes of collision (the occurrence of a collision or the inevitability of a collision) of the vehicle V based on information from the collision sensor 62. The ECU 60 then actuates the inflator 32 in a case in which a collision of the vehicle V is detected or predicted based on the information from the collision sensor 62.

The ECU 60 includes a drive-to-refuge ECU 64 (an element broadly understood to be a "drive-to-refuge controller"), and the vehicle V is driven by the drive-to-refuge ECU 64 to take refuge at the road shoulder in a case in which the drive-to-refuge mode is executed. The drive-to-refuge ECU 64 is configured including a drive ECU 64A, a steering ECU 64B, and a braking ECU 64C. The drive ECU 64A is electrically connected to a power unit (engine) 80 of the vehicle V, and controls so as to drive the power unit 80. The steering ECU 64B is electrically connected to electrical steering 82, serving as a "steering system" of the vehicle V, and controls the steering of the electrical steering 82. The braking ECU 64C is electrically connected to a brake 84 of the vehicle V, and is configured so as to control the brake 84 to cause the vehicle V to brake.

The drive-to-refuge ECU 64 determines whether or not the vehicle V is capable of running normally after actuation of the multidirectional airbag device 28. Specifically, configuration is such that the drive ECU 64A determines whether or not the power unit 80 is operating normally, the steering ECU 64B determines whether or not the electrical steering 82 is operating normally, and the braking ECU 64C determines whether or not the brake 84 is operating normally. In the drive-to-refuge mode, the drive-to-refuge ECU 64 of the ECU 60 controls the power unit 80, the electrical steering 82, and the brake 84 of the vehicle V such that the vehicle V is driven to take refuge at the road shoulder.

A surrounding information acquisition device 66 for acquiring information about the surroundings of the vehicle V is also electrically connected to the ECU 60. The surrounding information acquisition device 66 is configured including an onboard camera 66A mounted to the vehicle V, a laser sensor 66B, and a drive recorder 66C serving as a "storage section". The onboard camera 66A images the surroundings (in front, behind, and at the left and right sides) of the vehicle V, and acquires information (such as white lines or obstacles on the road being traveled) about the surroundings of the vehicle V. The laser sensor 66B is a sensor that employs laser radar, millimeter wave radar, or the like to detect the distance to objects in the surroundings (in front, behind, and at the left and right sides) of the vehicle V. The drive recorder 66C is configured so as to save (store) image data captured by the onboard camera 66A. The ECU 60 is configured so as to recognize information about the surroundings of the vehicle V based on the information acquired by the surrounding information acquisition device 66.

Note that in a case in which the drive-to-refuge mode has been executed by the ECU 60 after the multidirectional airbag device 28 has been actuated, setting is such that the vehicle V is driven to take refuge (stop) at the road shoulder. Specifically, in the drive-to-refuge mode, the ECU 60 recognizes the positions of white lines on the road, any obstacles in the surroundings of the vehicle V, and so on based on the information (image data) output from the onboard camera 66A to the ECU 60. The ECU 60 then drives the vehicle V to take refuge at the road shoulder while advancing forward or reversing by controlling the power unit 80, the electrical steering 82, and the brake 84 of the vehicle V using the drive-to-refuge ECU 64 based on the information regarding recognized positions of white lines on the road, obstacles in the surroundings of the vehicle V, and so on. More specifically, the drive-to-refuge ECU 64 controls so as to drive the vehicle V to take refuge at a position beyond the white line on the road shoulder, and to stop the vehicle V at this position. In cases in which there is an obstacle such as a wall or guard rail on the road shoulder, the ECU 60 drives the vehicle V to a position where the vehicle V does not collide with the obstacle, based on information from the onboard camera 66A, the laser sensor 66B, and so on. The vehicle V may be stopped in a position straddling the white line on the road shoulder, for example, in such cases. Namely, in the drive-to-refuge mode, the vehicle V is driven to take refuge at the road shoulder in order to avoid being rear-ended by other vehicles, such as vehicles following behind. This drive-to-refuge mode is hereafter referred to as a first drive-to-refuge mode.

Supposing a case in which the onboard camera 66A has been damaged in a collision of the vehicle V, the ECU 60 utilizes image data stored by the drive recorder 66C directly prior to the collision to execute the drive-to-refuge mode and to drive the vehicle V to the road shoulder (this drive-torefuge mode is hereafter referred to as a second drive-to-refuge mode). In such a case, the position of the vehicle V after the collision is sometimes offset from the position of the vehicle V directly prior to the collision, due to the vehicle V colliding with another vehicle or the like. In this case, for example, the ECU 60 may compute the position of the vehicle V and the orientation of the vehicle V after the collision based on collision acceleration information and so on obtained by the collision sensor 62, and stop the vehicle V at the road shoulder using the computed position and orientation information regarding the vehicle V. In a case in which this is performed, the vehicle V is driven to a position where it does not contact obstacles (including the other vehicle that has collided) in the surroundings of the vehicle V based on information from the laser sensor 66B and so on, similarly to as previously described.

An audio guidance device 68, serving as a "notification device", is also electrically connected to the ECU 60, and the audio guidance device 68 is configured including a speaker. The ECU 60 is set so as to control the audio guidance device 68 in a case in which the drive-to-refuge mode has been executed, such that the fact that the drive-to-refuge mode has been executed is provided as audio guidance from the audio guidance device 68.

A termination switch 70 is also electrically connected to the ECU 60 in order to terminate the drive-to-refuge mode (the first drive-to-refuge mode and the second drive-to-refuge mode). The termination switch 70 is provided in a position (such as a center console or a side door of the vehicle V) that the seated occupant D is capable of operating, for example. The drive-to-refuge mode is terminated by the ECU 60 and the vehicle V switches to manual driving in a case in which the seated occupant D operates the termination switch 70. Thus, the drive-to-refuge mode can be terminated and the vehicle V switched to manual driving by the seated occupant D operating the termination switch 70 after removing the actuated multidirectional airbag 30 from their head H, for example.

A warning display device such as a hazard light 72 for displaying a warning that the vehicle V has stopped after a collision of the vehicle V is also electrically connected to the ECU 60. In a case in which the vehicle V has been stopped by the ECU 60 after a collision of the vehicle V, the ECU 60 is configured so as to display the hazard light 72 by flashing to notify that the vehicle V has stopped.

Figure 8:
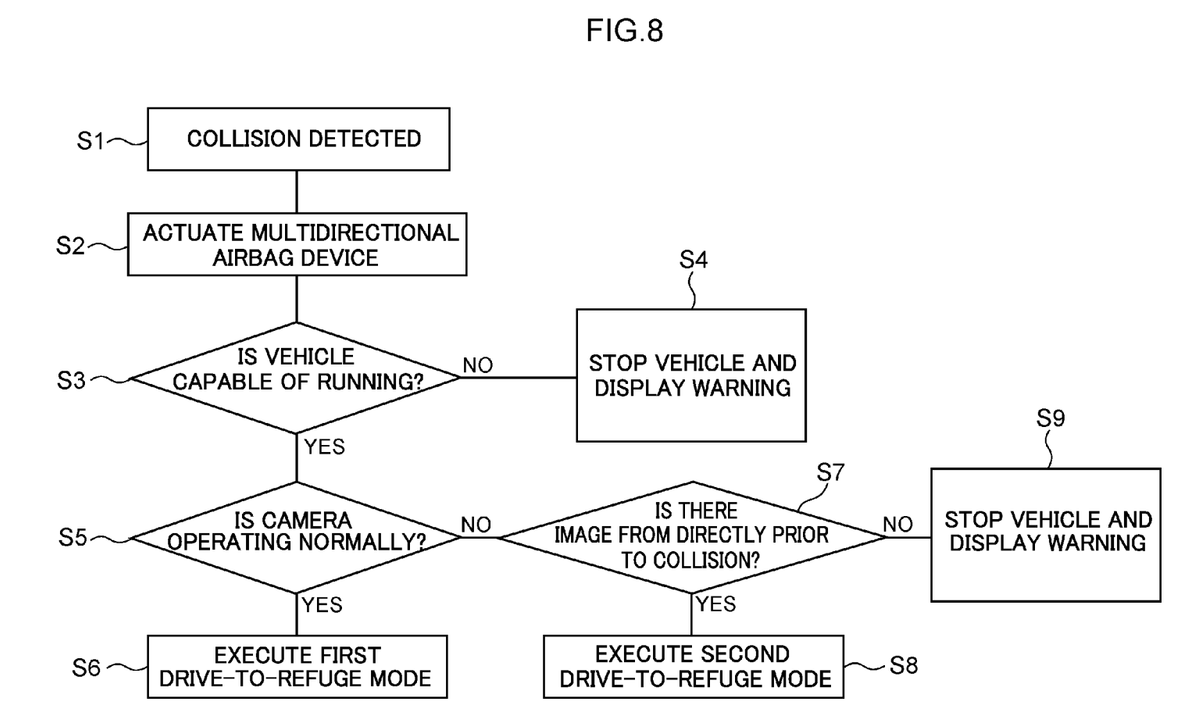
FIG. 8 is a flowchart for explaining operation of the vehicle control device illustrated in FIG. 1.

Explanation follows regarding operation and advantageous effects of the present exemplary embodiment, with reference to the flowchart illustrated in FIG. 8.

In the vehicle control device 10 configured as described above, in a case in which the ECU 60 detects or predicts a collision of the vehicle V based on information from the collision sensor 62 at step 1, processing transitions to step 2, and the multidirectional airbag device 28 is actuated by the ECU 60. Specifically, at step 2, the ECU 60 actuates the inflator 32 of the multidirectional airbag device 28. The multidirectional airbag 30 of the multidirectional airbag device 28 is thereby inflated and deployed so as to surround the head H of the seated occupant D as illustrated in FIG. 2 and FIG. 3. The head H of the seated occupant D is thereby protected by the multidirectional airbag 30. After step 2 has been executed, processing transitions to step 3.

At step 3, the drive-to-refuge ECU 64 of the ECU 60 determines whether or not the vehicle V is capable of running normally after actuation of the multidirectional airbag device 28. Specifically, the drive ECU 64A determines whether or not the power unit 80 is operating normally, the steering ECU 64B determines whether or not the electrical steering 82 is operating normally, and the braking ECU 64C determines whether or not the brake 84 is operating normally.

If the drive-to-refuge ECU 64 determines at step 3 that the vehicle V is in a state in which it is incapable of running, processing transitions to step 4. At step 4, since the vehicle V is in a state in which it is incapable of running, the ECU 60 stops the power unit 80 of the vehicle V using the drive ECU 64A, and controls such that the hazard light 72 is displayed by flashing, so as to display a warning that the vehicle V has stopped using the hazard light 72.

If the drive-to-refuge ECU 64 of the ECU 60 determines at step 3 that the vehicle V is in a state in which it is capable of running, processing transitions to step 5. At step 5, the ECU 60 determines whether or not the onboard camera 66A is operating normally based on an output signal from the onboard camera 66A. If the ECU 60 determines that the onboard camera 66A is operating normally at step 5, processing transitions to step 6, and the ECU 60 executes the first drive-to-refuge mode. In a case in which this is performed, the ECU 60 controls the audio guidance device 68 such that audio guidance that the first drive-to-refuge mode has been executed is provided from the audio guidance device 68 to the seated occupant D.

In the first drive-to-refuge mode at step 6, the ECU 60 recognizes the position of white lines on the road, obstacles in the surroundings of the vehicle V, and so on based on information from the onboard camera 66A. The ECU 60 then controls the power unit 80, the electrical steering 82, and the brake 84 using the drive-to-refuge ECU 64 to drive the vehicle V forward or in reverse to the road shoulder based on the information from the onboard camera 66A. For example, in cases in which the vehicle V is in a front-end collision, the ECU 60 recognizes obstacles that have been run into such as another vehicle based on information from the onboard camera 66A, controls so as to drive the power unit 80 using the drive ECU 64A so that the vehicle V reverses, and controls the steering of the electrical steering 82 using the steering ECU 64B based on the position of the white line at the road shoulder, to drive the vehicle V. In contrast thereto, for example, in cases in which the vehicle V has been involved in a rear-end collision, the ECU 60 recognizes obstacles that have run into the rear end such as another vehicle based on information from the onboard camera 66A, controls so as to drive the power unit 80 using the drive ECU 64A so that the vehicle V advances forward, and controls the steering of the electrical steering 82 using the steering ECU 64B based on the position of the white line at the road shoulder, to drive the vehicle V. The vehicle V is driven from the vehicle lane to a refuge position beyond the white line of the road shoulder and the vehicle V is stopped at the refuge position under the control of the drive-to-refuge ECU 64. In cases in which there is an obstacle such as a wall or a guard rail at the road shoulder, the ECU 60 controls the drive-to-refuge ECU 64 so as to drive the vehicle V to a position where the vehicle V does not collide with the obstacle, based on information acquired by the onboard camera 66A and/or the laser sensor 66B and so on.

At step 5, if the ECU 60 determines that the onboard camera 66A is not operating normally based on an output signal from the onboard camera 66A, processing transitions to step 7. At step 7, the ECU 60 determines whether or not an image from directly prior to the collision is stored in the drive recorder 66C. In cases in which an image from directly prior to the collision is stored in the drive recorder 66C at step 7, processing transitions to step 8.

At step 8, the ECU 60 executes the second drive-to-refuge mode and drives the vehicle V to the road shoulder using the image data from directly prior to the collision stored in the drive recorder 66C. In a case in which this is performed, the position of the vehicle V after the collision is sometimes offset from the position of the vehicle V directly prior to the collision, due to the vehicle V colliding with another vehicle or the like. In such cases, the ECU 60 computes the position of the vehicle V and the orientation of the vehicle V after the collision based on collision acceleration information and so on obtained by the collision sensor 62, and stops the vehicle V at the road shoulder using the computed position and orientation information regarding the vehicle V. In a case in which this is performed, the vehicle V is driven to a position where it does not contact obstacles (including the other vehicle that has collided) in the surroundings of the vehicle V based on information from the laser sensor 66B and so on, similarly to as previously described. Also at step 8, the ECU 60 controls the audio guidance device 68 such that audio guidance that the drive-to-refuge mode has been executed is provided from the audio guidance device 68 to the seated occupant D.

If the ECU 60 determines at step 7 that an image from directly prior to the collision is not stored in the drive recorder 66C, processing transitions to step 9. At step 9, similarly to at step 4, the ECU 60 stops the power unit 80 of the vehicle V using the drive ECU 64A, and controls such that the hazard light 72 is displayed by flashing, so as to display a warning that the vehicle V has stopped using the hazard light 72.

The above vehicle control processing may be executed by putting into memory a vehicle control program stored in a non-volatile recording medium such as a hard disk drive (HDD), and an ECU 60 serving as a hardware processor reading the vehicle control program.

As explained above, in the vehicle control device 10, the drive-to-refuge mode (the first drive-to-refuge mode or the second drive-to-refuge mode) is executed under the control of the ECU 60 after actuation of the multidirectional airbag device 28. Specifically, the ECU 60 controls the power unit 80, the electrical steering 82, and the brake 84 of the vehicle V using the drive-to-refuge ECU 64 to drive the vehicle V to a refuge position at the road shoulder based on information about the surroundings of the vehicle V output from the surrounding information acquisition device 66. This enables the vehicle V to be moved to a position where being rear-ended by other vehicles is avoided, even in cases in which the field of vision of the seated occupant D is impaired due to the multidirectional airbag 30 surrounding the head H of the seated occupant D. Namely, even though the mesh section 40, this being a vision-enabling structure at the front side of the head H of the seated occupant D, is formed to the multidirectional airbag 30, the head H of the seated occupant D is surrounded by the multidirectional airbag 30, such that the field of vision at the sides of the seated occupant D is in a state that is impaired by the multidirectional airbag 30. It is thereby difficult for the seated occupant D to drive the vehicle V in a state wearing the multidirectional airbag device 28. Thus, the vehicle V can be moved to a position where being rear-ended by other vehicles is avoided, enabling a rear-end collision of the vehicle V with another vehicle to be prevented, even in cases in which the field of vision of the seated occupant D is impaired by the multidirectional airbag 30 surrounding the head H of the seated occupant D. This accordingly enables the safety of the seated occupant D after actuation of the multidirectional airbag device 28 to be improved.

In the first drive-to-refuge mode, the ECU 60 executes the first drive-to-refuge mode and drives the vehicle V forward or in reverse to the road shoulder based on information from the onboard camera 66A. This enables the vehicle V to be moved to a position where being rear-ended by other vehicles is avoided using the onboard camera 66A.

In the second drive-to-refuge mode, the ECU 60 executes the second drive-to-refuge mode and drives the vehicle V to the road shoulder using image data from directly prior to the collision stored in the drive recorder 66C. This enables the vehicle V to be moved to a position where being rear-ended by other vehicles is avoided using the drive recorder 66C, even in cases in which the onboard camera 66A is damaged during a collision of the vehicle V.

In a case in which the drive-to-refuge mode has been executed by the ECU 60, the ECU 60 controls the audio guidance device 68 such that audio guidance that the drive-to-refuge mode has been executed is provided from the audio guidance device 68 to the seated occupant D. This enables the seated occupant D to recognize that the drive-to-refuge mode is being executed. This reassures the seated occupant D that they can safely remove the multidirectional airbag 30 from their head H, for example, while the drive-to-refuge mode is being executed.

The vehicle control device 10 also includes the termination switch 70 for terminating the drive-to-refuge mode. The seated occupant D thereby operates the termination switch 70 to terminate the drive-to-refuge mode by the ECU 60 and switch the vehicle V to manual driving. This enables the seated occupant D to switch the vehicle V to manual driving by operating the termination switch 70 after removing the actuated multidirectional airbag 30 from their head H, for example.

Note that the present exemplary embodiment is configured such that the drive-to-refuge ECU 64 determines that the vehicle V is capable of running normally in cases in which the power unit 80, the electrical steering 82, and the brake 84 are operating normally at step 3. Configuration may instead be such that the drive-to-refuge ECU 64 determines that the vehicle V is capable of running normally in cases in which at least the power unit 80 and the electrical steering 82 are operating normally at step 3. In such cases, the shift position of a shift device of the vehicle V may be set to a parking position by the ECU 60, such that the vehicle V is caused to brake by the parking brake.

In the present exemplary embodiment, setting is such that the power unit 80 of the vehicle V is stopped by the drive ECU 64A and the hazard light 72 is displaying by flashing at step 4 and step 9. In addition to this, the ECU 60 may control the audio guidance device 68 such that audio notification is provided to the seated occupant D that the vehicle V has stopped at step 4 and step 9.

In the present exemplary embodiment, setting is such that the audio guidance device 68 provides audio guidance that the drive-to-refuge mode has been executed in a case in which the drive-to-refuge mode has been executed by the ECU 60; however, this audio guidance by the audio guidance device 68 may be omitted.

In the present exemplary embodiment, an example has been given in which the seat width direction of the vehicle seat 12 matches the vehicle width direction; however, the present disclosure is not limited thereto. For example, the vehicle seat 12 may be disposed at an angle with respect to the vehicle body, and may be configured such that its orientation with respect to the vehicle body is capable of being changed (rotated about a vertical axis). In such a configuration, a configuration including the multidirectional airbag 30 that is inflated and deployed so as to surround the head H of the seated occupant D can contribute to good protection of the head H. Since the multidirectional airbag 30 is stowed in the headrest 18 prior to inflation and deployment, the multidirectional airbag 30 is less liable to impinge on a vehicle cabin interior surface or a vehicle component, and is suppressed or prevented from hindering an operation to change the orientation of the vehicle seat 12 with respect to the vehicle body.

In the present exemplary embodiment, an example has been given in which the multidirectional airbag device 28 is disposed at the rear of (inside) the headrest 18; however, the present disclosure is not limited thereto. For example, a multidirectional airbag device may be disposed inside the seatback 16. In configurations in which the seatback 16 includes a backboard, for example, configuration may be such that the multidirectional airbag device 28 is stowed between the backboard and a seatback body. In configurations in which the multidirectional airbag device 28 is provided inside a headrest, any mode is sufficient as long as the functionality of the headrest is realized, and the multidirectional airbag device 28 may be provided between a cushioning material and a covering material of the headrest, for example. The multidirectional airbag device 28 may be provided spanning between the seatback 16 and the headrest 18.

In the above-described exemplary embodiment, an example has been given in which the multidirectional airbag 30 passes between the module case 34 and the upper portion and both left and right side portions of the headrest 18 in a face-on view to be inflated and deployed; however, the present disclosure is not limited thereto. For example, configuration may be such that the multidirectional airbag 30 is deployed only from above the headrest 18, or only from both left and right sides of the headrest 18.

In the airbag device of JP-A No. 2000-344044, a state arises in which the field of vision of the driver is blocked by the inflated airbag, and so it is difficult for the driver to drive the vehicle immediately after a collision. However, in a case in which the vehicle is stopped in the position it is at after a collision, there is a concern that another vehicle might rear-end the vehicle that has collided, for example. There is accordingly room for improvement in vehicles including such airbag devices with regards to improving the safety of an occupant after the airbag device has been actuated.

An object of the present disclosure is to obtain a vehicle control device capable of improving the safety of an occupant after an airbag device has been actuated.

A vehicle control device of a first aspect includes: an airbag device including an airbag that is inflated and deployed from a state stowed in a headrest or a seatback of a vehicle seat on receiving gas supplied by an inflator, the airbag being configured as an integral bag body for surrounding the head of an occupant with a front deployment section including a front inflation section that is inflated and deployed in front of a seat corresponding to the head and at least one of the shoulders or the chest of the occupant, and a left and right pair of lateral deployment sections including lateral inflation sections that are connected to the front deployment section and are inflated and deployed at the sides of the head of the occupant; and a controller that, after the airbag device has been actuated, executes a drive-to-refuge mode in which driving of a power unit of a vehicle and steering of a steering system are controlled to drive the vehicle to take refuge at a road shoulder.

In the vehicle control device with the above configuration, the airbag of the airbag device is stowed in the headrest or the seatback of the vehicle seat, and the airbag is inflated and deployed from the headrest or the seatback in a case in which the airbag is supplied with gas from the inflator. The airbag is configured as an integral bag body for surrounding the head of an occupant with the front deployment section and the left and right pair of lateral deployment sections. Specifically, the front deployment section includes the front inflation section that is inflated and deployed at the seat front of the head and at least one out of the shoulders or the chest of the occupant. The lateral deployment sections include the lateral inflation sections that are inflated and deployed at the sides of the head of the occupant, and the lateral inflation sections are connected to the front deployment section. This enables the head of the occupant to be protected from the seat front and sides during a collision of the vehicle.

Note that the controller executes the drive-to-refuge mode after actuation of the airbag device. Specifically, the controller controls the driving of the power unit of the vehicle and the steering of the steering system to drive the vehicle to take refuge at a road shoulder. Thus, the vehicle is moved to a position where being rear-ended by other vehicles can be avoided, enabling a rear-end collision of the vehicle with another vehicle to be prevented, even in cases in which the field of vision of the occupant is impaired by the airbag surrounding the head of the occupant. This accordingly enables the safety of the occupant after actuation of the airbag device to be improved.

A vehicle control device of a second aspect is the vehicle control device of the first aspect, further including an onboard camera that images surroundings of the vehicle, and a storage section that stores images captured by the onboard camera. The controller executes the drive-to-refuge mode based on an image captured by the onboard camera in cases in which the onboard camera is capable of operating, and the controller executes the drive-to-refuge mode based on image data from directly prior to a collision that is stored in the storage section in cases in which the onboard camera has been damaged during the collision of the vehicle.

In the vehicle control device with the above configuration, the surroundings of the vehicle are captured by the onboard camera, and the images captured by the onboard camera are stored in the storage section. The controller executes the drive-to-refuge mode based on an image captured by the onboard camera in cases in which the onboard camera is capable of operating. This enables the vehicle to be moved to a position where being rear-ended by other vehicles can be avoided using the onboard camera. The controller executes the drive-to-refuge mode based on image data from directly prior to a collision that is stored in the storage section in cases in which the onboard camera has been damaged during the collision of the vehicle. This enables the vehicle to be moved to a position where being rear-ended by other vehicles can be avoided using image data from directly prior to the collision, even in cases in which the onboard camera has been damaged.

A vehicle control device of a third aspect is the vehicle control device of the first aspect or the second aspect, further including a notification device that notifies an occupant by audio that the drive-to-refuge mode has been executed in a case in which the drive-to-refuge mode has been executed by the controller.

In the vehicle control device with the above configuration, the occupant is provided with audio notification that the drive-to-refuge mode has been executed in a case in which the drive-to-refuge mode has been executed by the controller, thereby enabling the occupant to recognize that the drive-to-refuge mode is being executed. This reassures the occupant that they can safely remove the airbag from their head, for example, while the drive-to-refuge mode is being executed.

The vehicle control device of the first aspect enables the safety of the occupant after actuation of the airbag device to be improved.

The vehicle control device of the second aspect enables the vehicle to be moved to a position where a collision with other vehicles can be avoided using the onboard camera and the storage section.

The vehicle control device of the third aspect enables the occupant to recognize that the drive-to-refuge mode is being executed.

What is claimed is:

1. A vehicle control device comprising:
   an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant;
   an onboard camera that images surroundings of the vehicle;
   a storage section that stores images captured by the onboard camera; and
   an electronic control unit configured to, after the airbag device has been actuated, execute a drive-to-refuge mode in which driving of a power unit of a vehicle and steering of a steering system are controlled to drive the vehicle to take refuge at a road shoulder,
   wherein the electronic control unit executes the drive-to-refuge mode based on an image captured by the onboard camera in a case in which the onboard camera is capable of operating, and
   the electronic control unit executes the drive-to-refuge mode based on image data, from directly prior to a collision, that is stored in the storage section in a case in which the onboard camera has been damaged during the collision of the vehicle.

2. The vehicle control device of claim 1, further comprising
   a notification device that notifies the occupant by audio that the drive-to-refuge mode has been executed in a case in which the drive-to-refuge mode has been executed by the electronic control unit.

3. A vehicle control method comprising:
   storing images captured by an onboard camera that images surroundings of the vehicle in a storage section; and
   after actuating an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant, executing a drive-to-refuge mode in which driving of a power unit of a vehicle and steering of a steering system are controlled and the vehicle is driven to take refuge at a road shoulder,
   wherein the drive-to-refuge mode is executed based on an image captured by the onboard camera in a case in which the onboard camera is capable of operating; and
   wherein the drive-to-refuge mode is executed based on image data, from directly prior to a collision, that is stored in the storage section in a case in which the onboard camera has been damaged during the collision of the vehicle.

4. The vehicle control method of claim 3, wherein
   in a case in which the drive-to-refuge mode has been executed, the occupant is notified by audio that the drive-to-refuge mode has been executed.

5. A non-transitory recording medium storing a program that causes a computer to execute a vehicle control process, the process comprising:
   storing images captured by an onboard camera that images surroundings of the vehicle in a storage section; and
   after actuating an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant, executing a drive-to-refuge mode in which driving of a power unit of a vehicle and steering of a steering system are controlled and the vehicle is driven to take refuge at a road shoulder,
   wherein the drive-to-refuge mode is executed based on an image captured by the onboard camera in a case in which the onboard camera is capable of operating; and
   wherein the drive-to-refuge mode is executed based on image data, from directly prior to a collision, that is stored in the storage section in a case in which the onboard camera has been damaged during the collision of the vehicle.

6. The non-transitory recording medium of claim 5, wherein:
   in a case in which the drive-to-refuge mode has been executed, the occupant is notified by audio that the drive-to-refuge mode has been executed.

7. A vehicle control device comprising:
   a display device;
   an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant; and an electronic control unit configured to determine whether a power unit of a vehicle and a steering system are operating normally after actuating the airbag device, the electronic control unit is configured to, after the airbag device has been actuated, execute a drive-to-refuge mode in which driving of the power unit of the vehicle and steering of the steering system are controlled to drive the vehicle to take refuge at a road shoulder when it is determined that the power unit of the vehicle and the steering system are operating normally, the electronic control unit is configured to control the display device to display a warning that the vehicle has stopped in a case in which the electronic control unit determines that the power unit or the steering system does not operate normally after actuating the airbag device.

8. The vehicle control device of claim 7, further comprising:
an onboard camera that images surroundings of the vehicle; and
a storage section that stores images captured by the onboard camera,
wherein the electronic control unit executes the drive-to-refuge mode based on an image captured by the onboard camera in a case in which the onboard camera is capable of operating, and
the electronic control unit executes the drive-to-refuge mode based on image data, from directly prior to a collision, that is stored in the storage section in a case in which the onboard camera has been damaged during the collision of the vehicle.

9. The vehicle control device of claim 7, further comprising
a notification device that notifies the occupant by audio that the drive-to-refuge mode has been executed in a case in which the drive-to-refuge mode has been executed by the controller.

10. A vehicle control method comprising:
after actuating an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant, determining whether a power unit of a vehicle and a steering system are operating normally after actuating the airbag device and executing a drive-to-refuge mode in which driving of the power unit of the vehicle and steering of the steering system are controlled and the vehicle is driven to take refuge at a road shoulder when it is determined that the power unit of the vehicle and the steering system are operating normally; and displaying a warning on a display device that the vehicle has stopped when it is determined that the power unit or the steering system does not operate normally after actuating the airbag device.

11. The vehicle control method of claim 10, wherein executing the drive-to-refuge mode includes:
storing images captured by an onboard camera that images surroundings of the vehicle in a storage section;
executing the drive-to-refuge mode based on an image captured by the onboard camera in a case in which the onboard camera is capable of operating; and
executing the drive-to-refuge mode based on image data, from directly prior to a collision, that is stored in the storage section in a case in which the onboard camera has been damaged during the collision of the vehicle.

12. The vehicle control method of claim 10, wherein
in a case in which the drive-to-refuge mode has been executed, the occupant is notified by audio that the drive-to-refuge mode has been executed.

13. A non-transitory recording medium storing a program that causes a computer to execute a vehicle control process, the process comprising:
after actuating an airbag device including an airbag that is inflated and deployed from a state of being stowed in a headrest or a seatback of a vehicle seat on receiving gas supplied by an inflator, the airbag being configured as an integral bag body for surrounding a head of an occupant with a front deployment section including a front inflation section that is inflated and deployed in front of a seat corresponding to the head and at least one of shoulders or a chest of the occupant, and a left and right pair of lateral deployment sections including lateral inflation sections that are connected to the front deployment section and are inflated and deployed at sides of the head of the occupant, determining whether a power unit of a vehicle and a steering system are operating normally after actuating the airbag device and executing a drive-to-refuge mode in which driving of the power unit of the vehicle and steering of the steering system are controlled and the vehicle is driven to take refuge at a road shoulder; and
displaying a warning on a display device that the vehicle has stopped when it is determined that the power unit or the steering system does not operate normally after actuating the airbag device.

14. The non-transitory recording medium of claim 13, wherein execution of the drive-to-refuge mode includes:
storing images captured by an onboard camera that images surroundings of the vehicle in a storage section;
executing the drive-to-refuge mode based on an image captured by the onboard camera in a case in which the onboard camera is capable of operating; and
executing the drive-to-refuge mode based on image data, from directly prior to a collision, that is stored in the storage section in cases in which the onboard camera has been damaged during the collision of the vehicle.

15. The non-transitory recording medium of claim 13, wherein:
in a case in which the drive-to-refuge mode has been executed, the occupant is notified by audio that the drive-to-refuge mode has been executed.

* * * * *